(12) United States Patent
Hayes et al.

(10) Patent No.: US 9,942,069 B2
(45) Date of Patent: Apr. 10, 2018

(54) METHODS AND DEVICES FOR FREQUENCY SHIFT DETECTION

(71) Applicant: Intel IP Corporation, Santa Clara, CA (US)

(72) Inventors: Matthew Hayes, Radebeul (DE); Goochul Chung, Belmont, CA (US); Chris Quanbeck, Schaumburg, IL (US); Xiangyang Zhuang, Lake Zurich, IL (US)

(73) Assignee: Intel IP Corporation, Santa Clara, CA (US)

( * ) Notice: Subject to any disclaimer, the term of this patent is extended or adjusted under 35 U.S.C. 154(b) by 42 days.

(21) Appl. No.: 15/246,589

(22) Filed: Aug. 25, 2016

(65) Prior Publication Data

US 2018/0062890 A1    Mar. 1, 2018

(51) Int. Cl.
| | |
|---|---|
| *H04J 11/00* | (2006.01) |
| *H04L 27/14* | (2006.01) |
| *H04L 5/00* | (2006.01) |
| *H04L 27/26* | (2006.01) |

(52) U.S. Cl.
CPC .............. *H04L 27/14* (2013.01); *H04J 11/00* (2013.01); *H04L 5/0048* (2013.01); *H04L 27/2671* (2013.01)

(58) Field of Classification Search
CPC ....... H04J 11/00; H04L 27/2671; H04L 27/14
USPC ......................................................... 375/340
See application file for complete search history.

(56) References Cited

U.S. PATENT DOCUMENTS

2016/0218845 A1* 7/2016 Iwai ..................... H04B 7/024
2016/0373222 A1* 12/2016 Pralea .................... H04J 11/00

* cited by examiner

*Primary Examiner* — Kevin M Burd
(74) *Attorney, Agent, or Firm* — Viering, Jentschura & Partner mbB

(57) ABSTRACT

A method and mobile communication device adapted for frequency synchronization with a radio access network (RAN) based on frequency shift detection in a first signal received at the mobile communication device, including: offsetting the first signal's frequency by a first value extracted from a second signal received at the mobile communication device; generating a replica of the first signal from a second value extracted from a third signal received at the mobile communication device; multiplying a component of the offset first signal with the replica to generate a product; transforming the product into a frequency-domain signal; and detecting a peak in the frequency-domain signal to determine the frequency shift.

25 Claims, 9 Drawing Sheets

US 9,942,069 B2

METHODS AND DEVICES FOR FREQUENCY SHIFT DETECTION

TECHNICAL FIELD

Various embodiments relate generally to methods and devices for wireless communications.

BACKGROUND

To detect cells, a $5^{th}$ Generation (5G) user equipment (UE) must perform a cell search procedure similar to legacy Radio Access Technologies (RATs). The cell search is used to obtain synchronization to the 5G Transmission Point (TP), e.g. base station, and acquire system parameters such as cell ID. In order to provide optimal performance and to minimize coverage outage, the cell search mechanism has to reliably detect cells in low signal-to-interference-plus-noise ratio (SINR) conditions to facilitate beam re-selection and inter-RAT handover at the cell edge.

UEs in Long Term Evolution (LTE) networks utilized reference signals such as Primary Synchronization Signals (PSSs) and Secondary Synchronization Signals (SSSs) to establish and maintain time synchronization with LTE cells. In LTE, timing synchronization is achieved through a two-stage detection process. Initial half-frame (i.e. 5 ms) timing is acquired through the time correction of the PSS. The SSS then resolves the timing ambiguity to a radio-frame boundary and acquires the cellID.

5G will introduce a third synchronization signal: the Extended Synchronization Signal (ESS) in order to solve the timing ambiguity of the PSS and SSS signals being repeated multiple times, typically fourteen times, in 5G within a measurement subframe. The ESS will be frequency rotated, i.e. cyclic shifted, in the frequency domain in order to resolve the transmitted symbol index. Accordingly, an efficient and accurate method, as well as corresponding device, is needed to detect the cyclic shift in the 5G cell search procedure.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
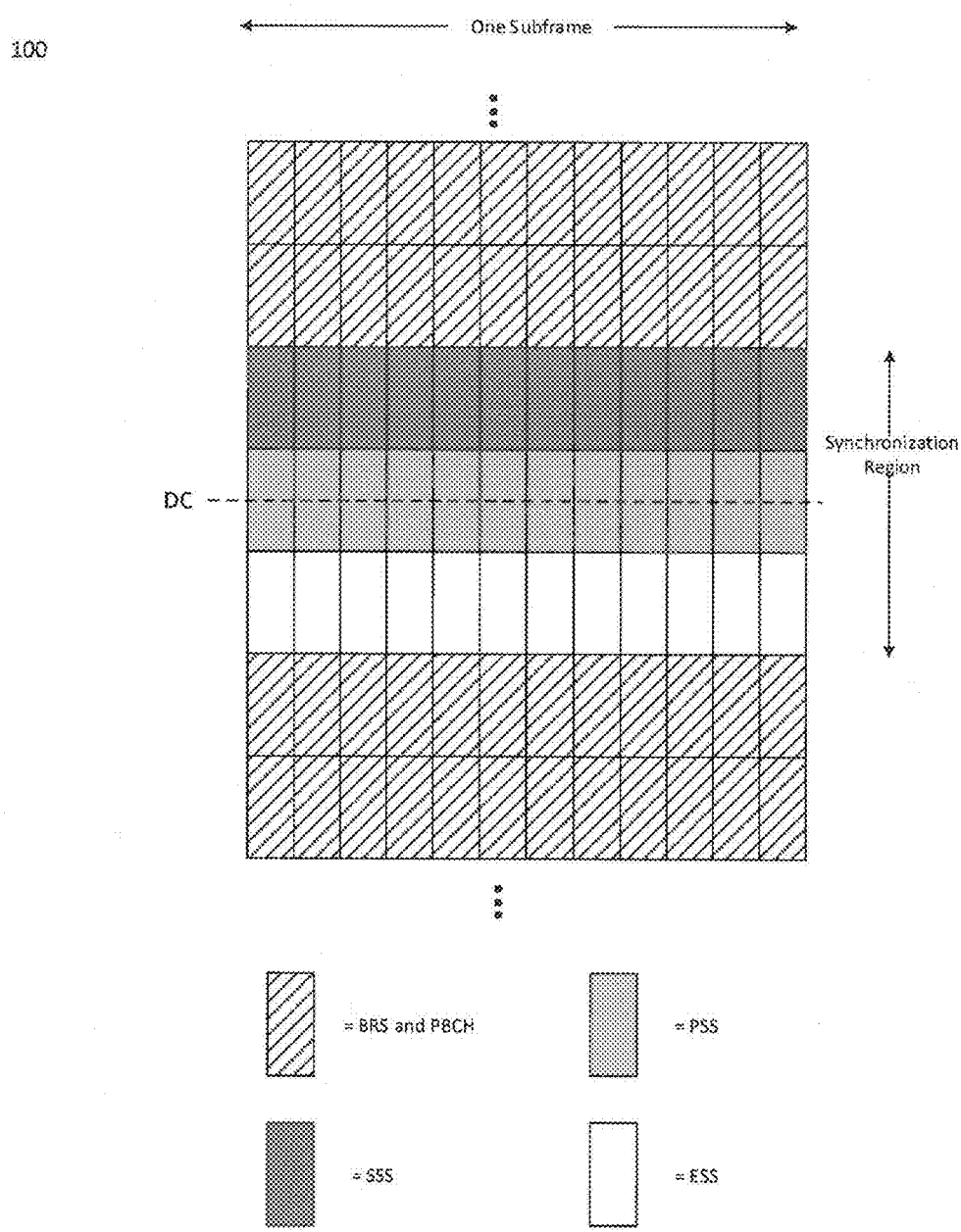
FIG. 1 shows an exemplary 5G measurement subframe.

The following detailed description refers to the accompanying drawings that show, by way of illustration, specific details and embodiments in which the invention may be implemented.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The terms "user equipment", "UE", "mobile terminal" (i.e. MT), "mobile station", (i.e. MS), "user terminal", etc., may apply to any wireless communication device, including cellular phones, tablets, laptops, personal computers, wearables, multimedia playback and other handheld electronic devices, consumer/home/office/commercial appliances, vehicles, and any number of additional electronic devices capable of wireless communications.

The term "base station" used in reference to an access point of a mobile communication network may be understood as a macro base station, micro base station, Node B, evolved NodeB (eNB), Home eNodeB, Remote Radio Head (RRH), relay point, etc.

As used herein, a "cell", in the context of telecommunications, may be understood as a sector served by a base station. Accordingly, a cell may be a set of geographically co-located antennas that correspond to a particular sector of a base station. A base station may thus serve one or more "cells" (or "sectors"), where each cell is characterized by a distinct communication channel. An "inter-cell handover" may be understood as a handover from a first "cell" to a second "cell", where the first "cell" is different from the second "cell". "Inter-cell handovers" may be characterized as either "inter-base station handovers" or "intra-base station handovers". "Inter-base station handovers" may be understood as a handover from a first "cell" to a second "cell", where the first "cell" is provided at a first base station and the second "cell" is provided at a second, different, base station. "Intra-base station handovers" may be understood as a handover from a first "cell" to a second "cell", where the first "cell" is provided at the same base station as the second "cell". A "serving cell" may be understood as a "cell" that a mobile terminal is currently connected to according to the mobile communications protocols of the associated mobile communications network standard. Furthermore, the term "cell" may be utilized to refer to any of a macrocell, microcell, femtocell, picocell, etc.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup tables and other array indexing or searching operations.

FIG. 1, shows a measurement subframe 100 for 5G. It is appreciated that subframe 100 is exemplary in nature and may thus be simplified for purposes of this explanation.

In subframe 100, the time domain is vertical and the frequency domain is horizontal. Only those portions of the 5G subframe which pertain to measurement are shown. The beamforming reference signal (BRS) and physical broadcast channel (PBCH) are included as they also pertain to measurement procedures.

In 5G, the PSS and SSS signals are largely inherited from the LTE structure, but are repeated fourteen times with a different beamforming pattern at the transmitter, i.e. base station. To resolve the fourteen timing hypothesis ambiguity, 5G introduces an Extended Synchronization Signal (ESS). The ESS signal will be a Zadoff-Chu (ZC) sequence with the root index mapped to the cell ID. To resolve the OFDM symbol index, each ESS is frequency rotated, and the number of frequency rotations is uniquely dictated by the symbol index. Additionally, the ESS has an option to use a scrambling sequence to reduce inter cell interference. The ESS symbol generation is explained in detail below.

Figure 2:
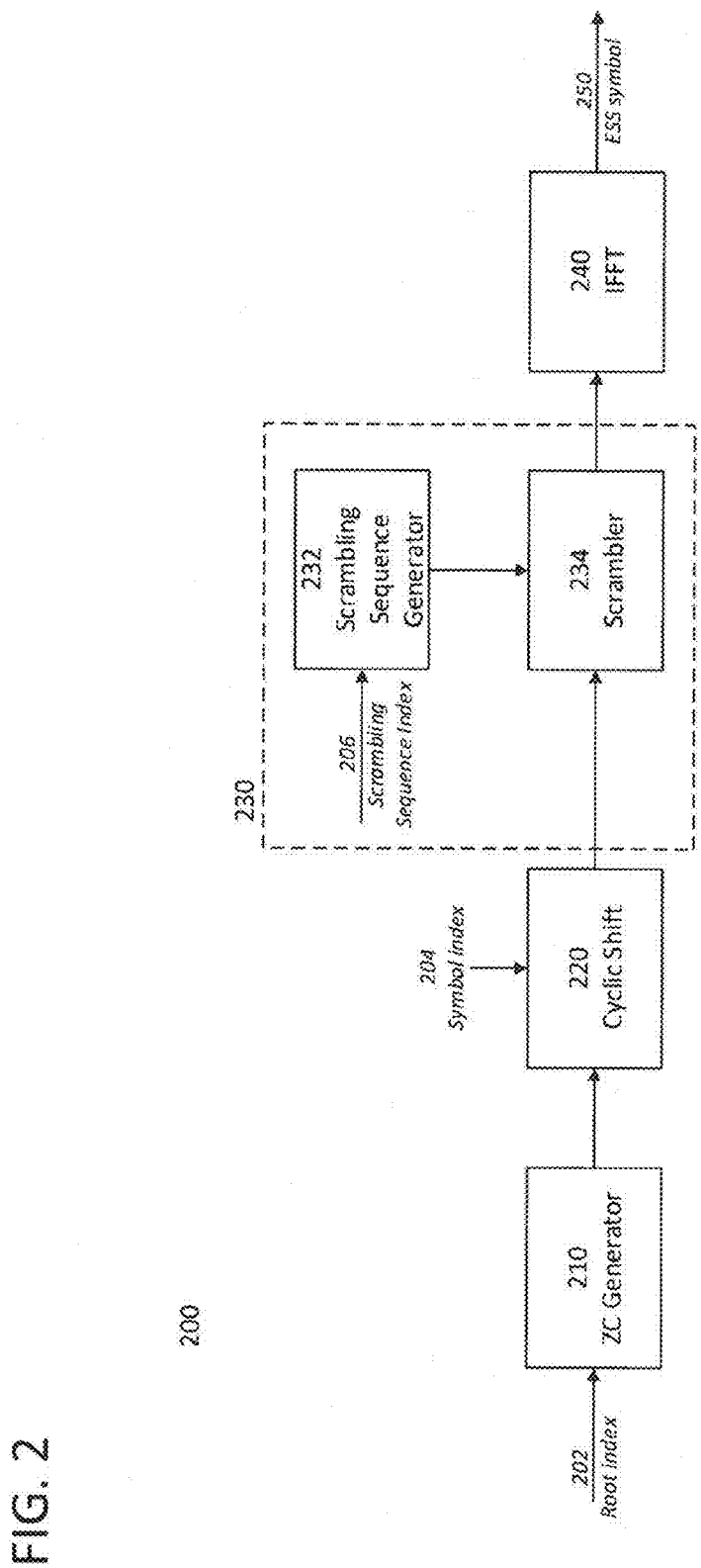
FIG. 2 shows an Extended Synchronization Signal (ESS) symbol Generator in an aspect of this disclosure.

FIG. 2 shows an ESS symbol generator 200. It is appreciated that ESS symbol generator 200 is exemplary in nature and may therefore be simplified for purposes of this explanation.

The ESS symbol generator 200 uses up to three inputs to generate each ESS symbol: a root index 202, a symbol index 204, and (optionally) a scrambling sequence index 206. If the scrambling sequence portion 230 of the ESS generation is not implemented, then only the root index 202 and the symbol index 204 are used as inputs in ESS symbol generation.

In the first step, the Zadoff Chu (ZC) generator 210 receives the root index 202 input to generate a ZC sequence. Next, a Cyclic Shift 220 component receives the output of the ZC generator 210 and the symbol index 204 in order to rotate the ZC output in the frequency domain, e.g. by 4 subcarriers.

If the scrambling sequence to reduce inter cell interference is implemented, the ESS generator 200 also includes the components outlined by dashed-line box 230. A scrambling sequence index 206 is fed into Scrambling Sequence Generator 232, which feeds the scrambling sequence into a Scrambler (i.e. Multiplier) 234, which "scrambles" (i.e. multiplies) the output from the cyclic shift component 220.

In either case, whether the scrambling option 230 is used or not, the final stage to ESS symbol generation is an Inverse fast Fourier transform (IFFT) 240 to generate a time domain ESS symbol 250.

The disclosure herein provides for fast and efficient ESS detection with low memory and silicon area footprints. By performing demodulation of the ESS in the time-domain and fast correlation in the frequency domain, it is possible to facilitate the detection of the ESS.

Figure 3:
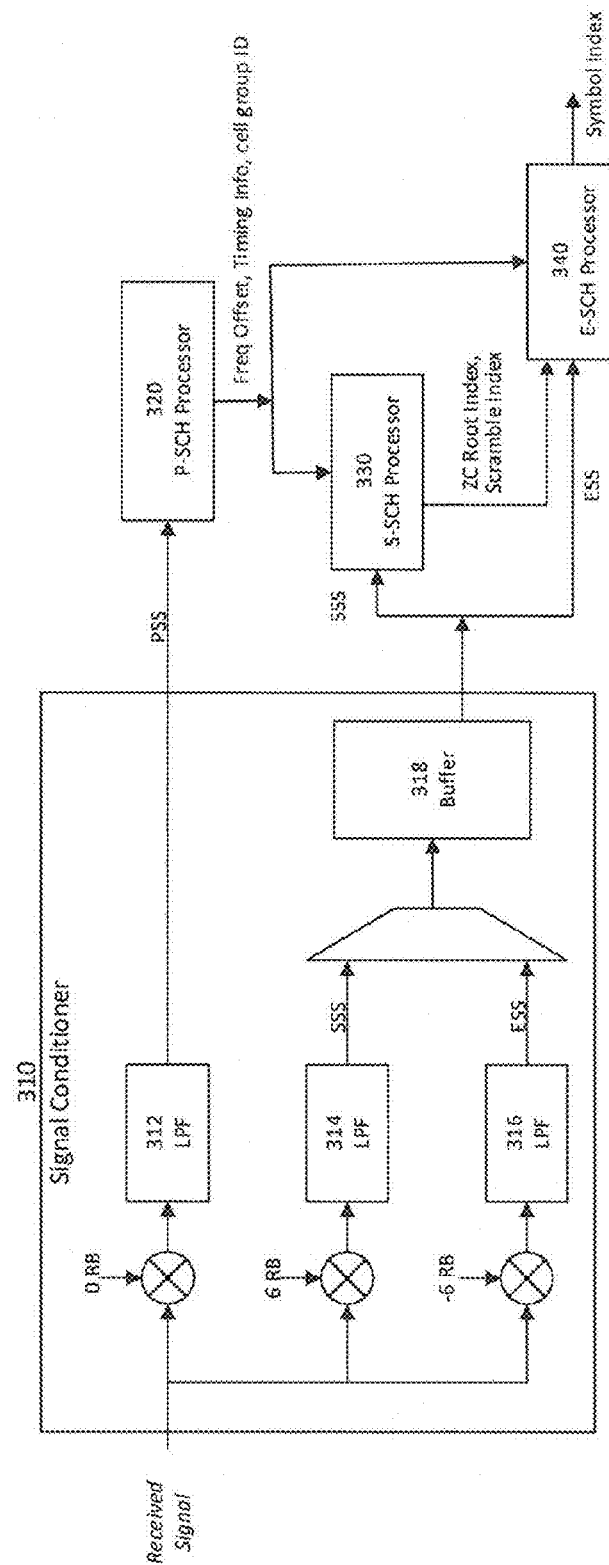
FIG. 3 shows a 5G cell-search component in an aspect of this disclosure.

FIG. 3 shows a 5G cell search component 300 in an aspect of this disclosure. It is appreciated that 5G cell search component 300 is exemplary in nature and may thus be simplified for purposes of this explanation.

The 5G cell search component 300 is divided into four subcomponents: a Signal Conditioner 310; a Primary Synchronization Channel (P-SCH) Processor 320; a Secondary Synchronization Channel (S-SCH) Processor 330; and an Extended Synchronization Channel (E-SCH) Processor 340.

The received signal, which comprises the PSS, SSS, and the ESS, passes through Signal Conditioner 310. Signal Conditioner 310 extracts the PSS, SSS, and ESS by band-limiting to the subcarrier frequencies pertaining to PSS, SSS, and ESS, respectively, i.e. by performing a frequency shift of the desired signal then low pass filtering (LPF) 312-316. The SSS and ESS are buffered 318 so that they can be passed to the S-SCH Processor 330 and E-SCH Processor 340, respectively, at a later stage.

The PSS is correlated, e.g. in the time domain, after LPF 312. The P-SCH Processor 320 uses this correlation to extract SSS, ESS timing information, and cell group ID to obtain a windowing hypothesis to perform SSS and ESS detection. Also, the P-SCH Processor 320 estimates a frequency offset and delivers the frequency offset estimate to both the S-SCH Processor 330 and the E-SCH Processor 340.

The S-SCH Processor 330 uses SSS, timing information, cell group ID, and the frequency offset to obtain a cell ID. Since the cell ID determines the ZC sequence root index and scramble index (if used), the S-SCH Processor 330 is able to extract this information and passes the indices to the E-SCH Processor 340.

The E-SCH Processor 340 is then able to determine the frequency shift applied to extract the OFDM symbol index within the measurement subframe, and, eventually, acquire the frame timing.

Figure 4:
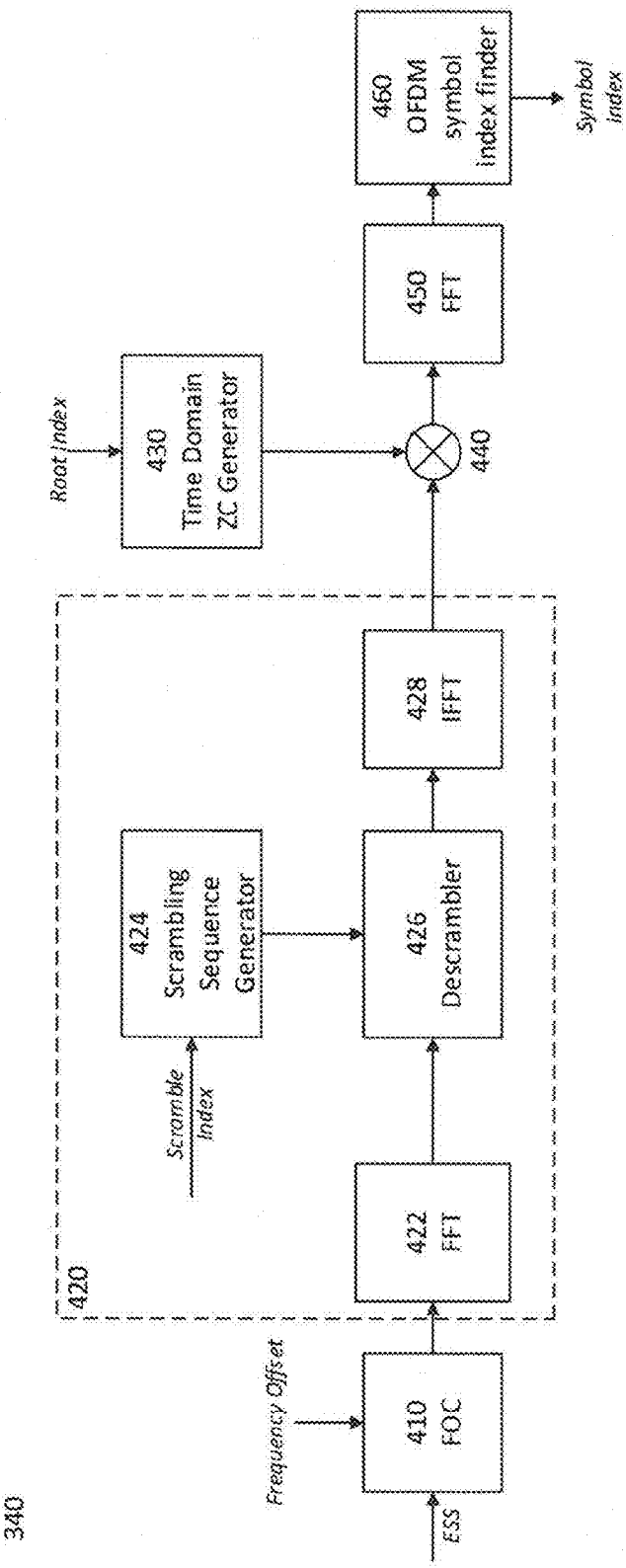
FIG. 4 shows an E-SCH processor in an aspect of this disclosure.

FIG. 4 shows a block diagram for an E-SCH Processor 340 in an aspect of this disclosure. It is appreciated that E-SCH Processor 340 is exemplary and nature and may thus be simplified for purposes of this explanation.

The Frequency Offset Compensator (FOC) 410 if compensated using the frequency offset estimate obtained from the P-SCH processor (320 in FIG. 3). This process can be executed by linear phase rotation with a sample index. By performing the frequency offset, the received ESS sequence can become more correlated with the transmitted ESS hypothesis and, consequently, increase the overall performance of ESS detection.

Descrambler 420 is necessary if a scrambling index was used to scramble the ESS sequence. If not, then Descrambler 420 is not needed. However, assuming that the ESS sequence was scrambled (to mitigate inter cell interference), the output of the FOC 410 is passed through a fast Fourier transform (FFT) 422 component to convert the sequence to the frequency domain, and then descrambled in the Descrambler 426 with the scrambling sequence from the Scrambling Sequence Generator 424, which is able to generate the scrambling sequence from the scramble index received from the S-SCH Processor (330 in FIG. 3). Afterwards, an IFFT 428 converts the signal back to the time domain. As previously discussed, since the scrambling is optional in the 5G system, Descrambler 420 can be bypassed if the scrambling is not applied in the ESS transmission.

Figure 4A:
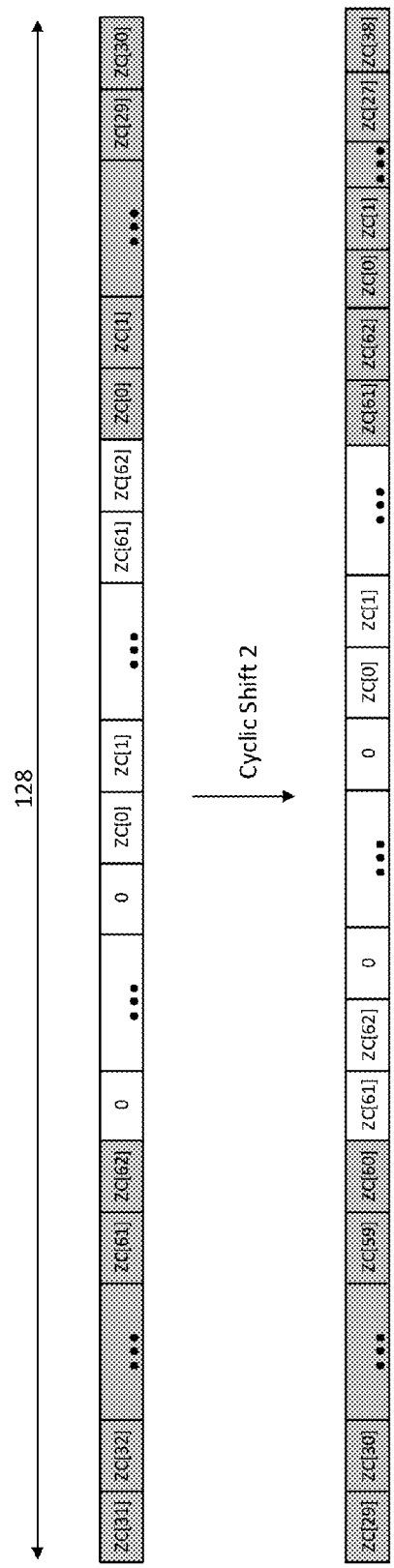
FIG. 4A shows an exemplary ZC sequence replica produced in an aspect of this disclosure.

The Time Domain ZC Generator 430 generates the replica of the time domain ZC sequence using the root index from the S-SCH Processor (330 in FIG. 3). In other words, the time-domain ESS signal is generated (e.g. read from a read-only memory (ROM)) corresponding to the cell ID acquired in the PSS/SSS detection. This time-domain ESS sequence can be a repetition of the ZC sequence depending on the size of FFT. The following properties for the time domain ZC sequence hold true: 1) The length of the time domain ZC sequence replica is equal to the received ESS sequence; 2) FFT of the time domain ZC sequence replica is equal to the ZC sequence used in the ESS transmission without a frequency shift where the ESS is loaded; and 3) the cyclic shift of the FFT of the time domain ZC sequence replica is a cyclic shift of the ZY sequence where the ESS is loaded. FIG. 4A provides more details on this aspect of the disclosure.

The time domain ZC sequence replica may be obtained, for example, by repeating the ZC sequence in the frequency domain, and taking the IFFT of it. The value may be stored, and extracted in time domain element wise multiplication.

The output of the Descrambler 420 (or the FOC 410 if the descrambling is bypassed) and the output of the Time Domain ZC Generator 430 are multiplied (i.e. demodulated) in Multiplier (i.e. Demodulator) 440. This demodulation uses the SSS, the timing information, cell group ID, and the frequency offset obtained from the other processing circuits (P-SCH and S-SCH). In one embodiment, this may involve element wise multiplication of the time domain elements of each signal.

The output of the Multiplier (i.e. Demodulator) 440 is processed by fast Fourier transform (FFT) 450. 440 and 450 utilize the correlation theorem of FFT, and the peak in the FFT output indicates the frequency shift applied in the ESS transmission.

The OFDM symbol index finder 460 is configured to detect this peak and map the peak index of the FFT output to the corresponding OFDM symbol index. The number of ESS frequency rotations (i.e. frequency shifts) is dictated by the OFDM symbol index. Therefore, if the number of ESS frequency rotations is determined, the matching OFDM symbol index may also be determined. For example, for the following chart:

| OFDM Symbol Index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| # of freq. rotations | 0 | 7 | 14 | 18 | 21 | 25 | 32 | 34 | 38 | 41 | 45 | 52 | 59 | 61 |

If the FFT output from FFT 450 indicates a peak frequency rotation of 32, using the chart above, an OFDM symbol Index of 6 can be determined. Other frequency rotation values are discarded. In other cases, the frequency rotation may be a multiple of the OFDM symbol index, such as four times the symbol index, i.e. ESS freq. rotations=4*OFDM Symbol Index. In these cases, once the number of frequency rotations is determined from the peak of the output of FFT 450, the OFDM symbol index can easily be calculated.

The E-SCH Processor 340 herein disclosed utilizes fast correlation in the frequency domain in conjunction with the excellent correlation properties of ZC sequences to provide a very efficient ESS detection algorithm.

FIG. 4A shows the properties of the ZC sequence replica 400A produced by the Time Domain ZC Generator 430 in FIG. 4. It is appreciated that that ZC replica 400A is exemplary in nature and may therefore be simplified for purposes of this explanation.

FIG. 4A shows an example when the ESS length is 63, and the detection window is 128 samples long. Taking the IFFT of the top most figure in 400A provides the ZC sequence replica in the time domain.

As demonstrated in 400A, the length of the time domain ZC sequence replica is equal to the received ESS sequence, i.e. the IFFT output length will be 64 or 128 depending on the searcher sampling rates. Furthermore, the FFT of the time domain ZC sequence replica is equal to the ZC sequence used in the ESS transmission without the applied frequency shift at the time of ESS generation. And, the cyclic shift of the FFT of the time domain ZC sequence replica is a cyclic shift of the ZC sequence at ESS generation. These properties hold true for all cyclic shifts up to 63. For example, in the bottom figure in 400A, the shaded regions are a cyclic shift of 2 of the shaded regions of the top figure.

Figure 5:
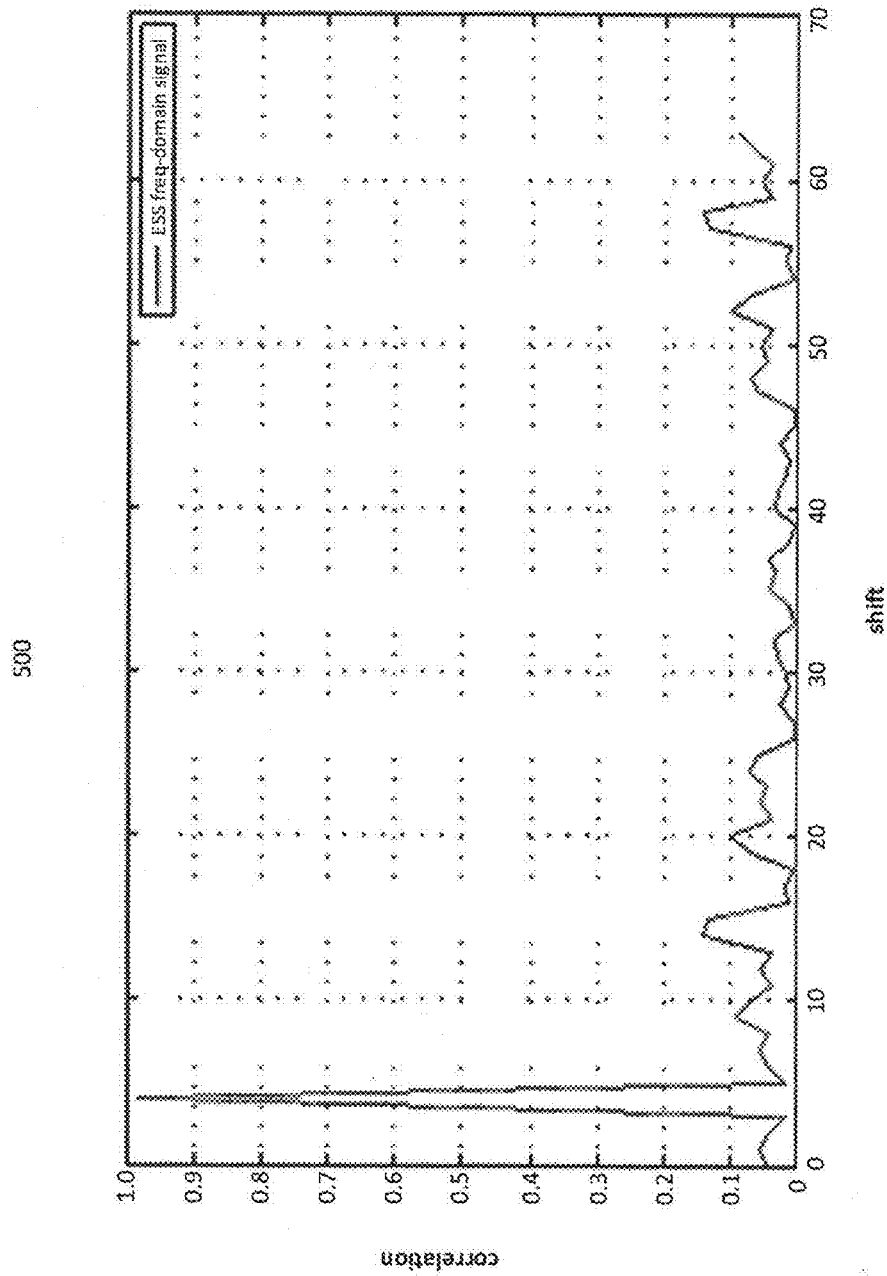
FIG. 5 shows a graph depicting the ESS detection results in an aspect of this disclosure.

FIG. 5 shows a graph 500 depicting the ESS detection results. As can be readily seen, the peak at a shift of 4 subcarriers (SCs) shows that the disclosure herein provides excellent correlation results at the indicated 4 SC cyclic shift offset implemented by ESSs. Further, the disclosure herein may be implemented into any system with a up to 63 cyclic shifts.

Figure 6:
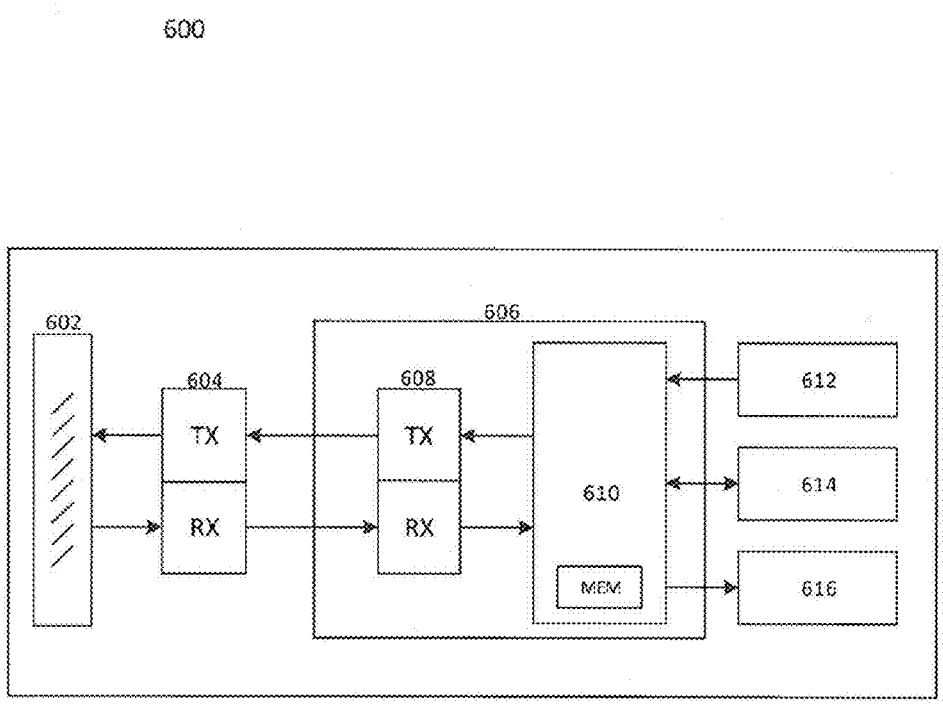
FIG. 6 shows an internal configuration of a communication device which may be configured to perform the cyclic shift detection, e.g. ESS detection procedure, of this disclosure.

FIG. 6 shows an internal configuration of UE 600, which may be configured to perform the cyclic shift detection, e.g. ESS detection procedure, of this disclosure. As shown in FIG. 6, UE 600 may include antenna system 602, radio frequency (RF) transceiver 604, baseband modem 606 (including physical layer processing circuit 608 and controller 610), data source 612, memory 614, and data sink 616. Although not explicitly shown in FIG. 6, UE 600 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identify module(s) (SIMs), user input/output devices (display(s), keypad(s), touchscreen(s), speaker(s), external button(s), camera(s), microphone(s), etc.), etc.

In an abridged operational overview, UE 600 may transmit and receive radio signals on one or more radio access networks. Baseband modem 606 may direct such communication functionality of UE 600 according to the communication protocols associated with each radio access network (RAN), and may execute control over antenna system 602 and RF transceiver 604 in order to transmit and receive radio signals according to the formatting and scheduling parameters defined by each communication protocol.

UE 600 may transmit and receive radio signals with antenna system 602, which may be a single antenna or an antenna array composed of multiple antennas and may additionally include analog antenna combination and/or beamforming circuitry. In the receive path (RX), RF transceiver 604 may receive analog radio frequency signals from antenna system 602 and perform analog and digital RF front-end processing on the analog radio frequency signals to produce digital baseband samples (e.g. In-Phase/Quadrature (IQ) samples) to provide to baseband modem 606. RF transceiver 604 may accordingly include analog and digital reception circuitry including amplifiers (e.g. a Low Noise Amplifier (LNA), filters, RF demodulators (e.g. an RF IQ demodulator)), and analog-to-digital converters (ADCs) to convert the received radio frequency signals to digital baseband samples. In the transmit path (TX), RF transceiver 604 may receive digital baseband samples from baseband modem 606 and perform analog and digital RF front-end processing on the digital baseband samples to produce analog radio frequency signals to provide to antenna system 602 for wireless transmission. RF transceiver 604 may thus include analog and digital transmission circuitry including amplifiers (e.g. a Power Amplifier (PA), filters, RF modulators (e.g. an RF IQ modulator), and digital-to-analog converters (DACs) to mix the digital baseband samples received from baseband modem 606 to produce the analog radio frequency signals for wireless transmission by antenna system 602. Baseband modem 606 may control the RF transmission and reception of RF transceiver 604, including specifying transmit and receive radio frequencies for operation of RF transceiver 604.

As shown in FIG. 6, baseband modem 606 may include physical layer processing circuit 608, which may perform physical layer (PHY layer, i.e. Layer 1) transmission and reception processing to prepare outgoing transmit data provided by controller 610 for transmission via RF transceiver 604 and prepare incoming received data provided by RF transceiver 604 for processing by controller 610. Physical layer processing circuit 608 may accordingly perform one or more of error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Physical layer processing circuit 608 may be structurally realized as hardware logic, e.g. as an integrated circuit or FPGA, as software logic, e.g. as program code defining arithmetic, control, and I/O instructions stored in a non-transitory computer-readable storage medium and executed on a processor, or as a combination of hardware and software logic. Although not explicitly shown in FIG. 6, physical layer processing circuit 608 may include a control circuit such as a processor configured to control the various hardware and software processing components of physical layer processing circuit 608 in accordance with physical layer control logic defined by the communications protocol for the relevant radio access technologies. Furthermore, while physical layer processing circuit 608 is depicted as a single component in FIG. 6, physical layer processing circuit 608 may be collectively composed separate sections of physical layer processing circuitry where each respective section is dedicated to the physical layer processing of a particular radio access technology.

The baseband modem 606 may be configured to implement any of the processes and method described herein, e.g. ESS detection. Baseband modem 606 may comprise the circuitry shown in FIG. 3 and FIG. 4 in order to implement the disclosure recited herein. For example, baseband modem 606 may implement the circuitry/processors shown in FIG. 3 (and by extension, FIG. 4) in the physical layer processing circuit 608.

Physical layer processing circuit 608 may include ESS detection circuitry comprising signal conditioning circuitry (as shown by 310 in FIG. 3), P-SCH processing circuitry (as shown by 320 in FIG. 3), S-SCH processing circuitry (as shown by 330 in FIG. 3), and E-SCH processing circuitry (as shown by 340 in FIG. 3). Each of the aforementioned components of ESS detections circuitry may be structurally realized as hardware logic, e.g. as one or more integrated circuits or FPGAs, as software logic, e.g. as one or more processors executing program code that defining arithmetic, control, and I/O instructions stored in a non-transitory computer-readable storage medium, or as a combination of hardware and software logic. Skilled persons will appreciate the possibility to embody each component of ESS detection circuitry in software and/or software according to the functionality detailed herein.

UE 600 may be configured to operate according to one or more radio access technologies (RATs), which may be directed by controller 610. Controller 610 may thus be responsible for controlling the radio communication components of UE 600 (antenna system 602, RF transceiver 604, and physical layer processing circuit 608) in accordance with the communication protocols of each supported RAT, and accordingly may represent the Access Stratum and Non-Access Stratum (NAS) (also encompassing Layer 2 and Layer 3) of each supported RAT. Controller 610 may be structurally embodied as a protocol processor configured to execute protocol software (retrieved from controller memory MEM as shown in FIG. 6) and subsequently control the radio communication components of UE 600 in order to transmit and receive communication signals in accordance with the corresponding protocol control logic defined in the protocol software.

Controller 610 may therefore be configured to manage the radio communication functionality of UE 600 in order to communicate with the various radio and core network components of a radio communication network, and accordingly may be configured according to the communication protocols for 5G, LTE and GSM/UMTS legacy networks. Controller 610 may either be a unified controller that is collectively responsible for all supported RATs (e.g. 5G and LTE and/or GSM/UMTS) or may be composed of multiple separate controllers where each controller is a dedicated controller for a particular RAT, such as e.g. a dedicated 5G controller and a dedicated legacy controller (or alternatively a dedicated 5G controller, dedicated LTE controller, and a dedicated GSM controller). Regardless, controller 610 may be responsible for directing radio communication activity of UE 600 according to the communication protocols of 5G and legacy networks. As previously noted, physical layer processing circuit 608, one or both of antenna system 602 and RF transceiver 604 may similarly be partitioned into multiple dedicated components that respectively correspond to one or more of the supported RATs. Depending on the specifics of each such configuration and the number of supported RATs, controller 610 may be configured to control the radio communication operations of UE 600 in accordance with a master/slave RAT hierarchical or multi-SIM scheme.

UE 600 may further comprise data source 612, memory 614, and data sink 616, where data source 612 may include sources of communication data above controller 610 (i.e. above the NAS/Layer 3) and data sink 616 may include destinations of communication data above controller 610 (i.e. above the NAS/Layer 3). Such may include, for example, an application processor of UE 600, which may be configured to execute various applications and/or programs of UE 600 at an application layer of UE 600, such as e.g. an Operating System (OS), a User Interface (UI) for supporting user interaction with UE 600, and/or various user applications. The application processor may interface with baseband modem 606 (as data source 612/data sink 616) as an application layer to transmit and receive user data such as voice data, audio/video/image data, messaging data, application data, basic Internet/web access data, etc., over a the radio network connection(s) provided by baseband modem 606. Data source 612 and data sink 616 may additionally represent various user input/output devices of UE 600, such as display(s), keypad(s), touchscreen(s), speaker(s), external button(s), camera(s), microphone(s), etc., which may allow a user of mobile terminal 102 to control various communication functions of UE 600 associated with user data.

Memory 614 may embody a memory component of UE 600, such as e.g. a hard drive or another such permanent memory device. Although not explicitly depicted in FIG. 6, the various other components of UE 600 shown in FIG. 6 may additionally each include integrated permanent and non-permanent memory components, such as for storing software program code, buffering data, etc.

Figure 7:
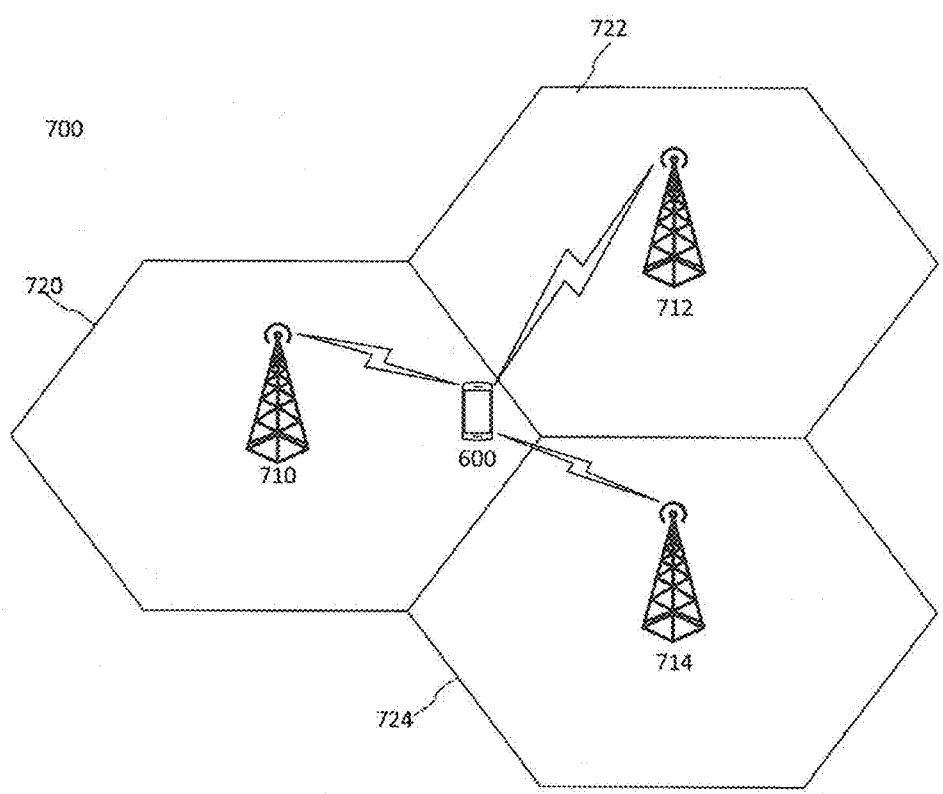
FIG. 7 shows a communication network in an aspect of this disclosure.

FIG. 7 shows a diagram of radio communication network 700, which may be a 5G capable network containing UE 600 and base stations 710, 712, and 714 and their corresponding coverage regions, i.e. cells 720-724. Each of base stations 710-712 may be a 5G base station and may be sectorized, i.e. composed of multiple cells. Furthermore, even though cells 720-724 are shown as having distinct boundaries, it is appreciated that cell coverage may overlap.

While cells 720-724 are shown as macro cells, it is appreciated that the disclosure herein also applied to other cells, e.g. femtocells, picocells, etc.

Depending on the operational status of UE 600, UE 600 may exchange uplink and/or downlink data with one or more of cells 720-724. For example, UE 600 may be connected with cell 720 of base station 710 (in a radio connected state) and may thus transmit and receive data with cell 104a over radio channel 114a. One or both of UE 600 and cell 720 may additionally be configured according to a Multiple Input Multiple Output (MIMO) transmission scheme, in which case radio channel may be further divided into a plurality of MIMO channels that each correspond to the unique path between a given transmit antenna of base station 710 and a given receive antenna of UE 600.

In order to maintain good performance at UE 600, UE 600 may need to maintain both time and frequency synchronization with at least one of base station 710-714 through the detection of PSS, SSS, and ESS. For example, in terms of time synchronization, UE 600 may need to remain aligned with the data symbol boundaries in the timing schedule used by cell 720. In terms of frequency synchronization, UE 600 may need to tune its receiver to the correct carrier frequency of base station 710 in order to effectively downlink/uplink radio signals with base station 710. The UE may use the reception of the PSS to achieve subframe, slot, and symbol synchronization in the time domain while using the SSS to achieve radio frame synchronization, in addition to the indices obtained from these signals as shown in FIG. 3.

Accordingly, UE 600 may be configured to implement the methods and processes described in this disclosure, and may include the appropriate hardware and software to implement such methods and processes, in order to search for cells and remain synchronized with network 700.

The synchronization techniques herein disclosed may be derived via a system of transmitted 5G signals. It is noted that while the description herein may focus on the 5G context, the implementations detailed in this disclosure may be analogously applied to any similar RAT.

Figure 8:
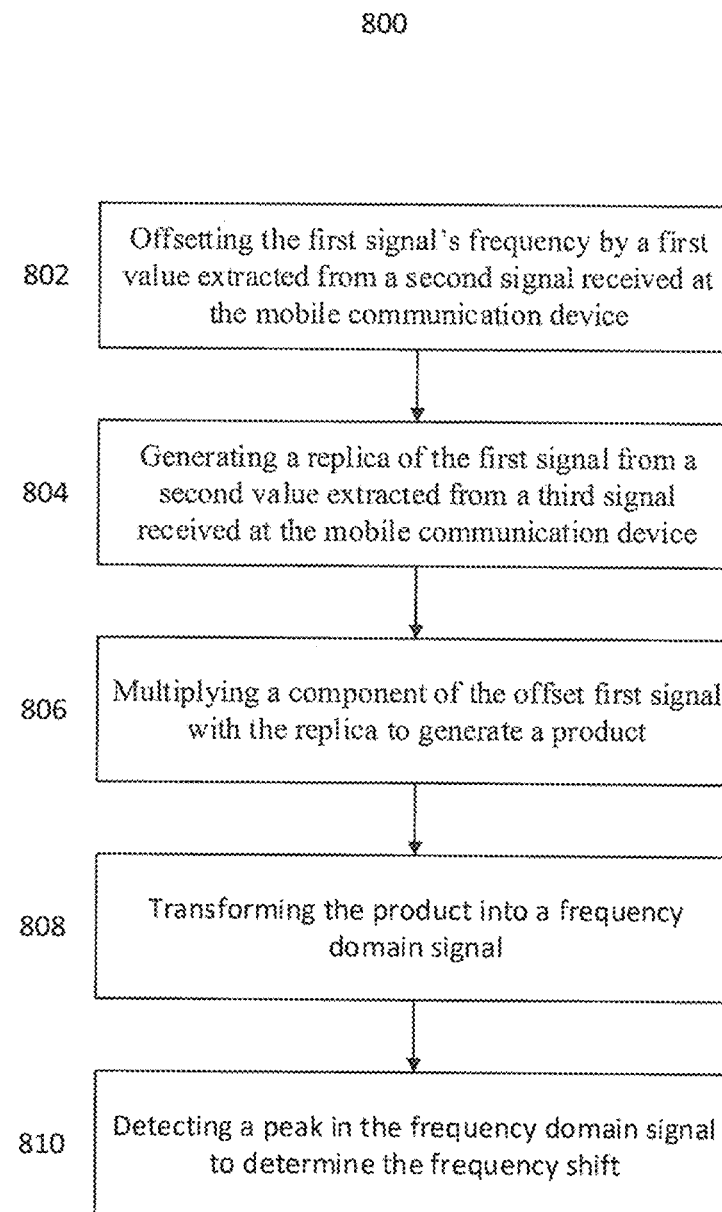
FIG. 8 shows a flowchart describing a method of this disclosure.

FIG. 8 shows a flowchart 800 showing a method to detect a frequency shift in an aspect of this disclosure. It is appreciated that flowchart 800 is exemplary in nature and may therefore be simplified for purposes of this explanation.

A first signal's (e.g. ESS) frequency is offset by a first value (e.g. frequency offset) extracted from a second received signal (e.g. PSS) 802. A replica (e.g. a time domain replica) of the first signal (e.g. ESS) is generated from a second value (e.g. a root index, i.e. ZC root index) extracted from a third received signal (e.g. SSS) 804. Both of the two resulting signals (the offset frequency signal of 802 and the replica generated in 804) are demodulated, i.e. multiplied, together to get a product 806. Then, the product is transformed into the frequency domain 808, where a peak detector detects a peak in the frequency domain signal to determine the frequency shift 810.

In Example 1, a method adapted for frequency synchronization with a radio access network (RAN) based on frequency shift detection in a first signal received at the mobile communication device, including: offsetting the first signal's frequency by a first value extracted from a second signal received at the mobile communication device; generating a replica of the first signal from a second value extracted from a third signal received at the mobile communication device; multiplying a component of the offset first signal with the replica to generate a product; transforming the product into a frequency-domain signal; and detecting a peak in the frequency-domain signal to determine the frequency shift.

In Example 2, the subject matter of Example 1 may include prior to the multiplying, descrambling the offset first signal using a third value extracted from the third signal.

In Example 3, the subject matter of Examples 1-2 may include using the frequency shift to extract a symbol index.

In Example 4, the subject matter of Example 3 may include acquiring a frame timing using the symbol index.

In Example 5, the subject matter of Examples 1-4 may include wherein the replica is a time domain replica.

In Example 6, the subject matter of Examples 1-5 may include wherein the component is in the time domain.

In Example 7, the subject matter of Examples 1-6 may include wherein the RAN is a 5G RAN.

In Example 8, the subject matter of Examples 1-7 may include wherein the first signal is an Extended Synchronization Signal (ESS).

In Example 9, the subject matter of Examples 1-8 may include wherein the second signal is a Primary Synchronization Signal (PSS).

In Example 10, the subject matter of Examples 1-9 may include wherein the third signal is a Secondary Synchronization Signal (SSS).

In Example 11, the subject matter of Examples 1-10 may include wherein the first value is a frequency offset value.

In Example 12, the subject matter of Examples 1-11 may include wherein the second value is a root index value.

In Example 13, the subject matter of Examples 1-12 may include wherein the replica is a Zadoff Chu (ZC) sequence.

In Example 14, the subject matter of Examples 2-13 may include wherein the third value is a scramble index.

In Example 15, the subject matter of Examples 1-14 may include wherein the multiplying is done on an element-wise basis.

In Example 16, the subject matter of Examples 1-15 may include wherein the transforming is done by fast Fourier transform (FFT).

In Example 17, a circuit arrangement adapted for frequency shift detection used in a mobile communication device, including: offset circuitry configured to offset a frequency of a first signal received at the device by a first value extracted from a second signal received at the device; generation circuitry configured to generate a replica of the first signal from a second value extracted from a third signal received at the device; demodulation circuitry configured to multiply a component of the offset first signal with the replica to generate a product; transformation circuitry configured to transform the product into a frequency-domain signal; and detection circuitry configured to detect a peak in the frequency-domain signal to determine the frequency shift.

In Example 18, the subject matter of Example 17 may include descrambling circuitry configured to descramble the offset first signal using a third value extracted from the third signal.

In Example 19, the subject matter of Examples 17-18 may include the detection circuitry further configured to use the frequency shift to extract a symbol index.

In Example 20, the subject matter of Example 19 may include acquisition circuitry configured to acquire a frame timing using the symbol index.

In Example 21, the subject matter of Examples 17-20 may include wherein the replica is a time domain replica.

In Example 22, the subject matter of Examples 17-21 may include wherein the component is in the time domain.

In Example 23, the subject matter of Examples 17-22 may include wherein the RAN is a 5G RAN.

In Example 24, the subject matter of Examples 17-23 may include wherein the first signal is an Extended Synchronization Signal (ESS).

In Example 25, the subject matter of Examples 17-24 may include wherein the second signal is a Primary Synchronization Signal (PSS).

In Example 26, the subject matter of Examples 17-25 may include wherein the third signal is a Secondary Synchronization Signal (SSS).

In Example 27, the subject matter of Examples 17-26 may include wherein the first value is a frequency offset value.

In Example 28, the subject matter of Examples 17-27 may include wherein the second value is a root index value.

In Example 29, the subject matter of Examples 17-28 may include wherein the replica is a Zadoff Chu (ZC) sequence.

In Example 30, the subject matter of Examples 18-29 may include wherein the third value is a scramble index.

In Example 31, the subject matter of Examples 17-300 may include the demodulation circuitry further configured to multiply the component of the offset first signal with the replica on an element-wise basis.

In Example 32, the subject matter of Examples 17-31 may include the transformation circuitry configured to perform fast Fourier transform (FFT).

In Example 33, a communication device adapted for frequency synchronization with a network based on frequency shift detection, the device including: a transceiver configured to receive signals from the network; a baseband modem comprising: offset circuitry configured to offset a frequency of a first signal received at the device by a first value extracted from a second signal received at the device; generation circuitry configured to generate a replica of the first signal from a second value extracted from a third signal received at the device; demodulation circuitry configured to multiply a component of the offset first signal with the replica to generate a product; transformation circuitry configured to transform the product into a frequency-domain signal; and detection circuitry configured to detect a peak in the frequency-domain signal to determine the frequency shift.

In Example 34, the subject matter of Example 33 may include the baseband modem further comprising descrambling circuitry configured to descramble the offset first signal using a third value extracted from the third signal.

In Example 35, the subject matter of Examples 33-34 may include the detection circuitry further configured to use the frequency shift to extract a symbol index.

In Example 36, the subject matter of Example 35 may include the baseband modem further comprising acquisition circuitry configured to acquire a frame timing using the symbol index.

In Example 37, the subject matter of Examples 33-36 may include wherein the replica is a time domain replica.

In Example 38, the subject matter of Examples 33-37 may include wherein the component is in the time domain.

In Example 39, the subject matter of Examples 33-38 may include wherein the network is a 5G RAN.

In Example 40, the subject matter of Examples 33-39 may include wherein the first signal is an Extended Synchronization Signal (ESS).

In Example 41, the subject matter of Examples 33-40 may include wherein the second signal is a Primary Synchronization Signal (PSS).

In Example 42, the subject matter of Examples 33-41 may include wherein the third signal is a Secondary Synchronization Signal (SSS).

In Example 43, the subject matter of Examples 33-42 may include wherein the first value is a frequency offset value.

In Example 44, the subject matter of Examples 33-43 may include wherein the second value is a root index value.

In Example 45, the subject matter of Examples 33-44 may include wherein the replica is a Zadoff Chu (ZC) sequence.

In Example 46, the subject matter of Examples 34-45 may include wherein the third value is a scramble index.

In Example 47, the subject matter of Examples 33-46 may include the demodulation circuitry further configured to multiply the component of the offset first signal with the replica on an element-wise basis.

In Example 48, the subject matter of Examples 33-47 may include the transformation circuitry configured to perform fast Fourier transform (FFT).

In Example 49, a non-transitory computer readable medium including program instructions which when executed cause a processor of a device to synchronize with a radio access network (RAN) based on frequency shift detection in a first signal received at the mobile communication device, including: offsetting the first signal's frequency by a first value extracted from a second signal received at the mobile communication device; generating a replica of the first signal from a second value extracted from a third signal received at the mobile communication device; multiplying a component of the offset first signal with the replica to generate a product; transforming the product into a frequency-domain signal; and detecting a peak in the frequency-domain signal to determine the frequency shift.

In Example 50, the subject matter of Example 49 may include prior to the multiplying, descrambling the offset first signal using a third value extracted from the third signal.

In Example 51, the subject matter of Examples 49-50 may include using the frequency shift to extract a symbol index.

In Example 52, the subject matter of Example 51 may include acquiring a frame timing using the symbol index.

In Example 53, the subject matter of Examples 49-52 may include wherein the replica is a time domain replica.

In Example 54, the subject matter of Examples 49-53 may include wherein the component is in the time domain.

In Example 55, the subject matter of Examples 49-54 may include wherein the RAN is a 5G RAN.

In Example 56, the subject matter of Examples 49-55 may include wherein the first signal is an Extended Synchronization Signal (ESS).

In Example 57, the subject matter of Examples 49-56 may include wherein the second signal is a Primary Synchronization Signal (PSS).

In Example 58, the subject matter of Examples 49-57 may include wherein the third signal is a Secondary Synchronization Signal (SSS).

In Example 59, the subject matter of Examples 49-58 may include wherein the first value is a frequency offset value.

In Example 60, the subject matter of Examples 49-59 may include wherein the second value is a root index value.

In Example 61, the subject matter of Examples 49-60 may include wherein the replica is a Zadoff Chu (ZC) sequence.

In Example 62, the subject matter of Examples 50-61 may include wherein the third value is a scramble index.

In Example 63, the subject matter of Examples 49-62 may include, wherein the multiplying is done on an element-wise basis.

In Example 64, the subject matter of Examples 49-63 may include wherein the transforming is done by fast Fourier transform (FFT).

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement adapted for frequency shift detection used in a mobile communication device, comprising:
   offset circuitry configured to offset a frequency of a first signal received at the device by a first value extracted from a second signal received at the device;
   generation circuitry configured to generate a replica of the first signal from a second value extracted from a third signal received at the device;
   demodulation circuitry configured to multiply a component of the offset first signal with the replica to generate a product;
   transformation circuitry configured to transform the product into a frequency-domain signal; and
   detection circuitry configured to detect a peak in the frequency-domain signal to determine the frequency shift.

2. The circuit arrangement of claim 1, further comprising descrambling circuitry configured to descramble the offset first signal using a third value extracted from the third signal.

3. The circuit arrangement of claim 1, the detection circuitry further configured to use the frequency shift to extract a symbol index.

4. The circuit arrangement of claim 3, further comprising acquisition circuitry configured to acquire a frame timing using the symbol index.

5. The circuit arrangement of claim 1, wherein the replica is a time domain replica.

6. The circuit arrangement of claim 1, wherein the component is in the time domain.

7. The circuit arrangement of claim 1, wherein the first signal is an Extended Synchronization Signal (ESS).

8. The circuit arrangement of claim 1, wherein the second signal is a Primary Synchronization Signal (PSS).

9. The circuit arrangement of claim 1, wherein the third signal is a Secondary Synchronization Signal (SSS).

10. The circuit arrangement of claim 1, wherein the first value is a frequency offset value.

11. The circuit arrangement of claim 1, wherein the second value is a root index value.

12. The circuit arrangement of claim 1, wherein the replica is a Zadoff Chu (ZC) sequence.

13. The circuit arrangement of claim 2, wherein the third value is a scramble index.

14. The circuit arrangement of claim 1, the demodulation circuitry further configured to multiply the component of the offset first signal with the replica on an element-wise basis.

15. A communication device adapted for frequency synchronization with a network based on frequency shift detection, the device comprising:
   a transceiver configured to receive signals from the network;
   a baseband modem comprising:
      offset circuitry configured to offset a frequency of a first signal received at the device by a first value extracted from a second signal received at the device;
      generation circuitry configured to generate a replica of the first signal from a second value extracted from a third signal received at the device;
      demodulation circuitry configured to multiply a component of the offset first signal with the replica to generate a product;
      transformation circuitry configured to transform the product into a frequency-domain signal; and
      detection circuitry configured to detect a peak in the frequency-domain signal to determine the frequency shift.

16. The communication device of claim 15, the baseband modem further comprising descrambling circuitry configured to descramble the offset first signal using a third value extracted from the third signal.

17. The communication device of claim 15, the detection circuitry further configured to use the frequency shift to extract a symbol index.

18. The communication device of claim 17, the baseband modem further comprising acquisition circuitry configured to acquire a frame timing using the symbol index.

19. A method adapted for frequency synchronization with a radio access network (RAN) based on frequency shift detection in a first signal received at a mobile communication device, comprising:
   offsetting the first signal's frequency by a first value extracted from a second signal received at the mobile communication device;
   generating a replica of the first signal from a second value extracted from a third signal received at the mobile communication device;
   multiplying a component of the offset first signal with the replica to generate a product;
   transforming the product into a frequency-domain signal; and
   detecting a peak in the frequency-domain signal to determine the frequency shift.

20. The method of claim 19, further comprising, prior to the multiplying, descrambling the offset first signal using a third value extracted from the third signal.

21. The method of claim 19, further comprising using the frequency shift to extract a symbol index.

22. The method of claim 21, further comprising acquiring a frame timing using the symbol index.

23. A non-transitory computer readable medium including program instructions which when executed cause a processor of a device to synchronize with a radio access network (RAN) based on frequency shift detection in a first signal received at the mobile communication device, comprising:
   offsetting the first signal's frequency by a first value extracted from a second signal received at the mobile communication device;
   generating a replica of the first signal from a second value extracted from a third signal received at the mobile communication device;
   multiplying a component of the offset first signal with the replica to generate a product;
   transforming the product into a frequency-domain signal; and
   detecting a peak in the frequency-domain signal to determine the frequency shift.

24. The computer readable medium of claim 23, further comprising, prior to the multiplying, descrambling the offset first signal using a third value extracted from the third signal.

25. The computer readable medium of claim 23, further comprising using the frequency shift to extract a symbol index.

* * * * *